W. S. IRELAND.
REEL AND REEL MOUNTING.
APPLICATION FILED APR. 5, 1910.
980,279.
Patented Jan. 3, 1911.
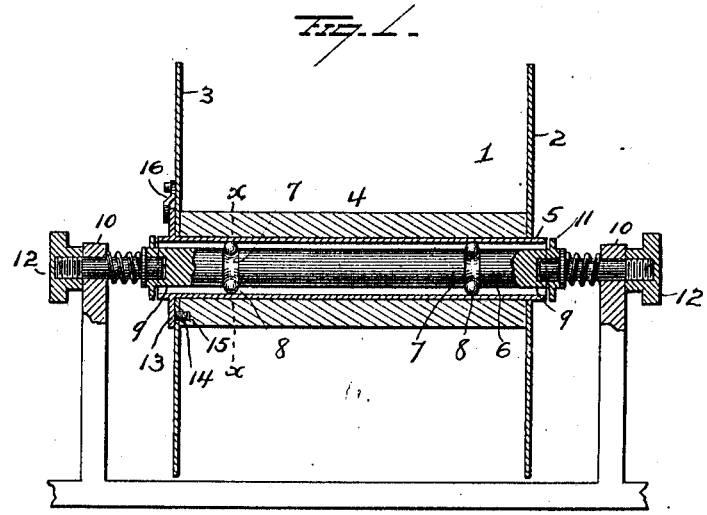
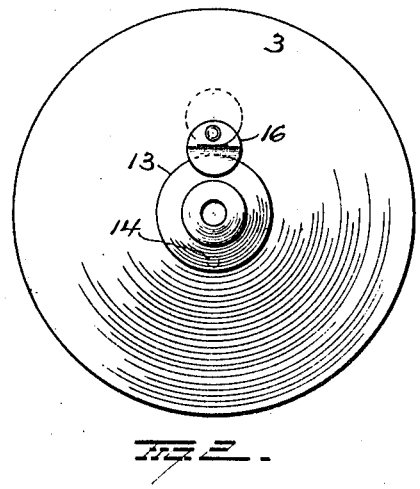
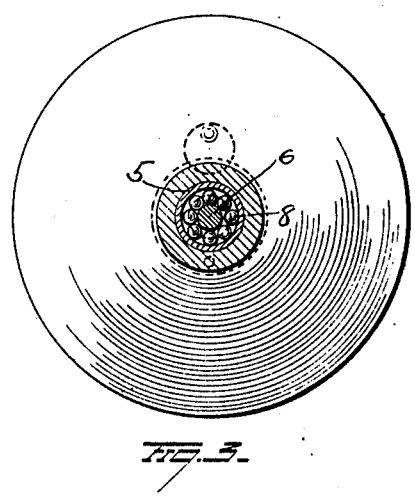
WITNESSES
INVENTOR
W. S. Ireland
By H. A. Seymour
Attorney

UNITED STATES PATENT OFFICE.

WARD S. IRELAND, OF DALLAS, TEXAS.

REEL AND REEL-MOUNTING.

980,279.     Specification of Letters Patent.     Patented Jan. 3, 1911.

Application filed April 5, 1910. Serial No. 553,501.

*To all whom it may concern:*

Be it known that I, WARD S. IRELAND, of Dallas, in the county of Dallas and State of Texas, have invented certain new and useful Improvements in Reels and Reel-Mountings; and I do hereby declare the following to be a full, clear, and exact description of the invention, such as will enable others skilled in the art to which it appertains to make and use the same.

This invention relates to improvements in reels and reel mountings and more particularly to such as are adapted for use with typewriting machines, rewinders therefor and analogous machines employing removable reels,—the object of the invention being to provide simple and efficient means whereby the application or removal of a reel will be facilitated and to so construct the devices that the reel, when in use will rotate freely.

With this object in view the invention consists in certain novel features of construction and combinations of parts as hereinafter set forth and pointed out in the claims.

In the accompanying drawings, Figure 1 is a longitudinal sectional view illustrating my improvements. Fig. 2 is an end view with the reel supporting means omitted, and Fig. 3 is a view on the line *x—x* of Fig. 1.

1 represents a reel comprising heads 2—3 and a tubular core 4 (preferably of wood) connecting said heads. A reel thus constructed is removably mounted upon a tube 5 and through the latter, a shaft 6 passes,— said shaft being provided with grooves 7 for the accommodation of anti-friction balls 8 disposed between said shaft and tube. The shaft 6 is provided at its respective ends with sockets 9 for the reception of spring-pressed studs 10 and said shaft is also provided at its ends with annular flanges 11 in line with the ends of the tube 5. Each of the studs 10 is longitudinally movable and provided with knobs 12 to facilitate the application of the shaft to and its removal from the studs.

The tube 5 is provided near one end with an annular flange 13 provided with a pin 14 passing through a hole in the adjacent reel head 3 and entering a socket 15 in the core 4. The reel is prevented from longitudinal movement in one direction on the tube 5 by engagement of the reel head 3 with the annular flange 13. Longitudinal movement of the reel in the other direction is prevented by means of a pivoted latch or disk 16 mounted on the reel head 3 and adapted to engage the outer face of the annular flange 13 on the tube 5.

When a reel has been filled and it is desired to remove the same from the machine, the studs 10 will be moved outwardly to release the shaft 6 and all the parts mounted thereon. By now raising the latch 16, the reel (comprising the core 4 and the heads 2—3) can be removed from the tube 5 and another reel replaced on the latter and the parts placed in position between the studs 10, as shown in Fig. 1.

Having fully described my invention what I claim as new and desire to secure by Letters-Patent, is,—

1. In a device of the character described, the combination of a shaft provided at its ends with sockets, yieldable studs entering said sockets, a tube revolubly mounted on said shaft, a reel removably mounted on said tube, and locking means for securing the reel to the tube.

2. In a device of the character described, the combination with a shaft and a tube revolubly mounted thereon and provided near one end with an annular flange, a reel mounted on said tube and engaging one face of said flange, a latch carried by the reel to engage the other face of said flange, and a pin carried by said flange and adapted to enter a socket in the reel.

3. In a device of the character described, the combination with a shaft provided in its ends with sockets, longitudinally movable studs to enter said sockets, and means for moving said studs, of a tube revolubly mounted on said shaft and provided at one end with an annular flange, a reel comprising a core and two heads mounted removably on said tube, one of said heads adapted to engage the annular flange on the tube, a latch on said reel head to engage the opposite face of said flange, and a pin projecting from said flange and adapted to enter the reel.

In testimony whereof, I have signed this specification in the presence of two subscribing witnesses.

WARD S. IRELAND.

Witnesses:
S. G. NOTTINGHAM,
GEO. F. DOWNING.